US007305701B2

(12) United States Patent
Brezak et al.

(10) Patent No.: US 7,305,701 B2
(45) Date of Patent: Dec. 4, 2007

(54) METHODS AND ARRANGEMENTS FOR CONTROLLING ACCESS TO RESOURCES BASED ON AUTHENTICATION METHOD

(75) Inventors: John E. Brezak, Woodinville, WA (US); Peter T. Brundrett, Seattle, WA (US); Richard B. Ward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 880 days.

(21) Appl. No.: 09/846,175

(22) Filed: Apr. 30, 2001

(65) Prior Publication Data

US 2002/0162030 A1 Oct. 31, 2002

(51) Int. Cl.
*G06F 7/04* (2006.01)

(52) U.S. Cl. .................. 726/5; 726/3; 726/6; 726/7; 726/8; 726/9; 726/18; 726/19; 713/167; 713/168; 713/172

(58) Field of Classification Search ............... 713/202, 713/200, 155–159, 167, 168; 380/281, 276; 726/4, 17–20, 27, 28, 5–9, 3, 172; 709/225, 709/226, 229; 711/147–153
See application file for complete search history.

(56) References Cited

U.S. PATENT DOCUMENTS 5,414,844 A * 5/1995 Wang .......................... 713/200
6,052,468 A * 4/2000 Hillhouse .................... 380/281
6,163,383 A * 12/2000 Ota et al. ..................... 358/1.1
6,609,198 B1 * 8/2003 Wood et al. ................. 713/155
6,687,823 B1 * 2/2004 Al-Salqan et al. .......... 713/167
6,711,681 B1 * 3/2004 Al-Salqan et al. .......... 713/184
6,915,426 B1 * 7/2005 Carman et al. ............. 713/168
6,959,336 B2 * 10/2005 Moreh et al. ............... 709/229
7,086,085 B1 * 8/2006 Brown et al. ................. 726/7
2001/0001156 A1 * 5/2001 Leppek ....................... 713/201

FOREIGN PATENT DOCUMENTS

EP  1 050 993  11/2000

OTHER PUBLICATIONS

"Network Authentication Tokens", Davis, R., IEEE, 1990, pp. 234-238.

* cited by examiner

*Primary Examiner*—Kim Vu
*Assistant Examiner*—Beemnet W Dada
(74) *Attorney, Agent, or Firm*—Lee & Hayes, PLLC

(57) ABSTRACT

In accordance with certain aspects of the present invention, improved methods and arrangements are provided that improve access control within a computer. The methods and arrangements specifically identify the authentication mechanism/mechanisms, and/or characteristics thereof, that were used in verifying that a user with a unique name is the actual user that the name implies, to subsequently operating security mechanisms. Thus, differentiating user requests based on this additional information provides additional control.

17 Claims, 2 Drawing Sheets

METHODS AND ARRANGEMENTS FOR CONTROLLING ACCESS TO RESOURCES BASED ON AUTHENTICATION METHOD

TECHNICAL FIELD

This invention relates to computers and computer networks, and more particularly to methods and arrangements for use in controlling access to various resources therein based on authentication methods.

BACKGROUND

In the past, executable content could only be installed on a computer system by physically bringing magnetic media to the computer and having a user with the applicable privileges (e.g., administrative privileges) install it. At present, however, the Internet, intranets, wide area networks (WANs), local area networks (LANs), etc., make it very easy for ordinary computer users to download executable content, such as, e.g., ActiveX® controls, programs, and scripts. In many cases, executable content may be downloaded and executed via the Internet without the user even realizing that such an event has occurred.

Unfortunately, every so often such executable content intentionally or unintentionally destabilizes the client machine in some manner. For example, the content may prove to be error-prone and cause the client machine to crash. The content may also undermine the security of the client machine by divulging confidential information about the client/user. Although these types of computer problems have previously existed in the form of "viruses" and "trojans," the ubiquitous presence of World Wide Web (WWW) portion of the Internet has made these problems even more widespread. In general, the operating environment of most clients is not adequately protected against such unruly code.

Some operating systems already have an existing security mechanism that limits what non-privileged users may do. For example, the security system built into the Windows® NT operating system controls access to resources based on the identities of users. When a Windows NT process wishes to access a resource to perform some action, the security mechanism in Windows NT compares a client's user and group IDs and privileges associated with that process against security information assigned to that resource to grant or deny access to the resource. In this manner, unauthorized users are prevented from accessing resources and potentially causing harm, while authorized users may be limited in the actions they are allowed to perform.

There are many different authentication methods available for use in the client operating system. By way of example, a client can select among Kerberos, NTLM, Digest, Secure Socket Layer (SSL) or others that are available within the operating system. Each of these protocols is different; the differences produce varying levels of assurance as to the identity of the principals involved. Those skilled in the art will appreciate the difference between a high-assurance method such as biometric authentication, and a lower assurance scheme such as a password.

Because the eventual end-users or administrators of a computer operating system must manage access to data, protect their resources against abuse, and other tasks, these are the appropriate people to decide what assurance they require for varying tasks. Viewing a web page, as an example, may be low value enough to allow use of a low-assurance method such as a password. Updating company financial information may require a higher assurance method such as SSL. Clearly, the benefit of a consistent method, across a variety of possible applications, for controlling access would be substantial.

Hence, there is a continuing need for improved methods and arrangements for controlling access to various networked servers, devices, services, applications, etc., especially in the Internet/intranet networking arena.

SUMMARY

In accordance with certain aspects of the present invention, improved methods and arrangements are provided for controlling access to resources in a computing environment. The methods and arrangements specifically identify the authentication mechanism/mechanisms, and/or characteristics thereof, used in verifying a user, to subsequently operating security mechanisms. Thus, differentiating user requests based on this additional information provides additional control.

By way of example, the above-stated needs and others are met by a method for use in a computer capable of supporting multiple authentication mechanisms. The method includes generating an operating system representation (e.g., a security token, etc) of at least one identity indicator, for example, a user or account identity, associated with and identifying at least one authentication mechanism, and subsequently controlling access to at least one resource based on the operating system representation. In certain implementations, the method further includes generating at least one security identifier (SID) that identifies the authentication mechanism in some way, for example, by name or number and/or perhaps by measure of strength such as the type/length of an encryption process/key employed by the authentication mechanism. In other implementations, for example, the method includes comparing the operating system representation to at least one access control list having at least one access control entry therein. Here, for example, the access control entry may operatively specify whether the user authenticated by the authentication mechanism is permitted to access the resource.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Authentication is basically the process of verifying that a user claiming a unique name or other identifier is in fact that user. In the physical world, this is often accomplished by using some form of documentation, issued by a trusted third party such as a government; a very common example is a passport. In the computer realm, this is often accomplished through an authentication protocol. Authorization is the determination of what a particular user or other principal is allowed to do. Authorization can take the form of limits, e.g. a credit limit on a credit card, or access controls, or, e.g.

limiting what areas of a building an employee is allowed to enter. Authentication and authorization are inter-related, but are often analyzed, and even implemented, quite separately.

Two common forms of authorization within a typical computer system are name-based and identity-based. Name-based authorization essentially uses a single identifier, the user name, to manage authorization decisions. Many web sites use this form; an example is only the user has access to the user's account at a typical commercial web site. The other form, identity-based, is a richer environment. Here, the operating system maintains the identifier for the user, and possibly additional identifiers indicating groups or collections of users managed by the administrator, for use by an application. Many UNIX-derived systems expose this as a user identifier and a list of group identifiers. Windows® NT and Windows® 2000 represent this with a construct named an access token, which contains the user identifier, the list of groups, and additional restrictions and/or privileges.

Authentication can be accomplished in either of two ways. One way is to associate a trustee name with a password on the initial connection to the data source object. The second and preferred way is to use secure access tokens or like Operating system representations of some identifying indicator granted by the operating system only to authentic users/accounts. Here, the access token or like operating system representation includes one or more security identification descriptors (SIDs) that can be matched against one or more discretionary access control lists (ACLs) or the like stored in a data store.

A number of conventional authentication techniques have been implemented in authentication packages. By way of example, Windows NT and Windows 2000 provide support for the Windows NT LAN Manager (NTLM). Windows 2000 provides additional support for the Kerberos security protocol. Other well-known authentication techniques include Secure Sockets Layer (SSL), Schannel, Passport, etc. Additionally, other proprietary authentication techniques may be implemented, which are similar.

Figure 1:
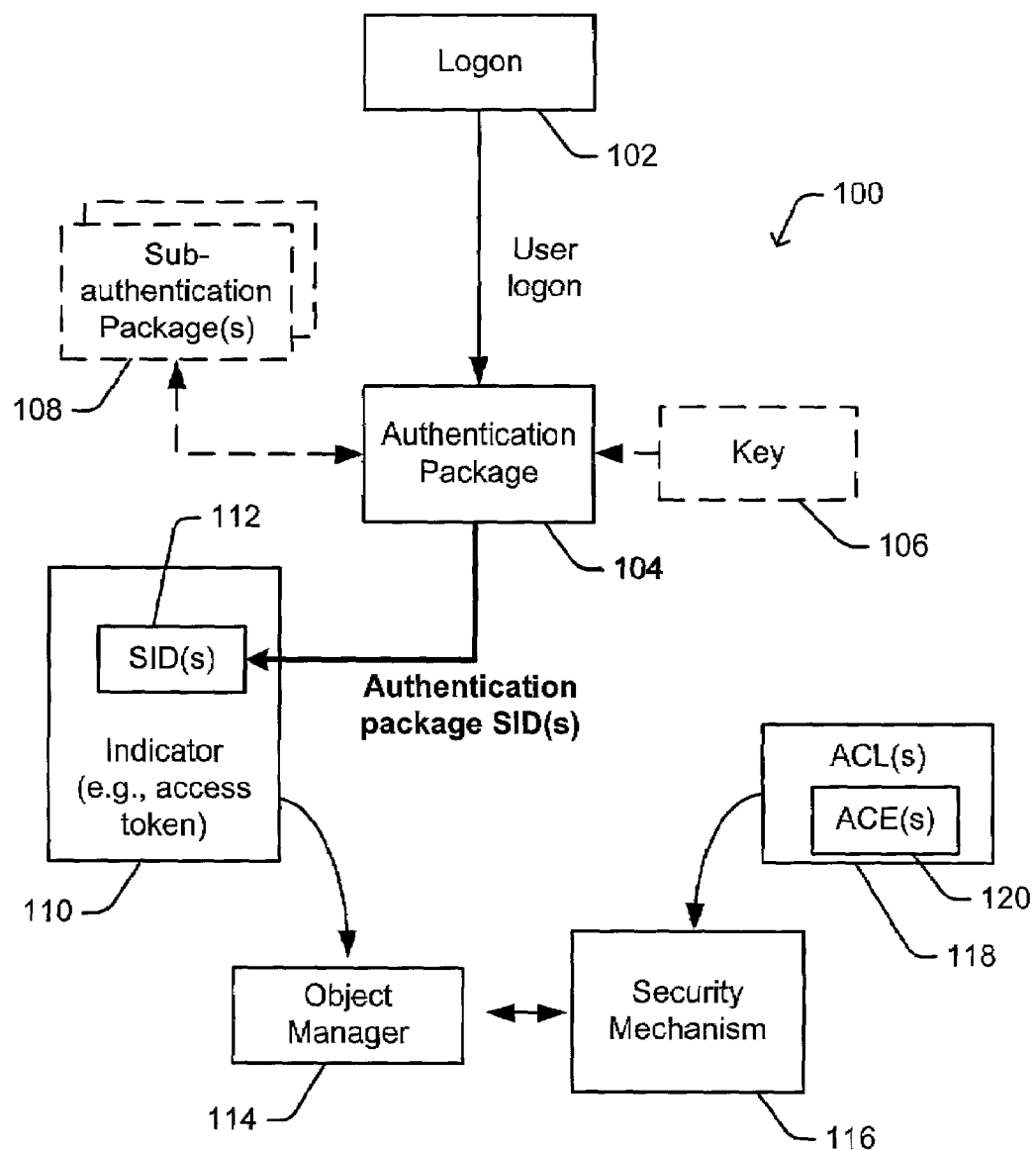
FIG. 1 is a block diagram depicting an exemplary functional arrangement for controlling access to resources in accordance with certain implementations of the present invention.

With this in mind, a generic arrangement 100 is provided in FIG. 1 that is readily adaptable to any similar arrangement. The essential functionality in arrangement 100 involves the use of an access token or like operating system representation 110 that has been further modified to include information that identifies one or more types, features and/or other aspects relating to the authentication package or packages that were used to validate the user/account. This operating system representation 110 advantageously provides for additional granularity in the overall system security model.

Thus, with reference to FIG. 1, arrangement 100 includes a logon function 102 that provides an interface with the user. The user is required to provide (i.e., input) a user/account name, password or other user/group identifier, for example. In certain implementations, logon function 102 may further interface with logic on a smart card or like portable token device. In still other implementations, biometric information about/from the user may be gathered by logon function 102.

Logon function 102 outputs user logon information, e.g., name and password (or hash of password) to an authentication package 104. Authentication package 104 is configured to authenticate or otherwise validate that the user (based on the user logon information) is the actual user that the name implies. As mentioned, there are a number of authentication techniques in use today.

Authentication package 104 may utilize an encoding or encryption scheme that requires a key 106. In certain implementations, the trustworthiness of the authentication technique may be tied to the strength (e.g., length) of key 106. This is mentioned because this may be a security measure that is later reflected in the operating system representation 110. Authentication package 104 may also call upon one or more other sub-authentication packages 108 to verify the user logon. The use of a sub-authentication package 108 may also affect the trustworthiness of the authentication technique, and as such may be reflected in a resulting operating system representation 110.

As depicted, authentication package 104 outputs one or more authentication package SIDs 112, which are provided within an operating system representation 110. In this example, operating system representation 110 is an object that identifies the user/account as described below and is permanently attached to the user's/account's processes.

Here, operating system representation 110 includes a conventional user SID based on the logon name and/or password, etc, and at least one authentication package SID 112. Operating system representation 110 may further include other attributes such as, e.g., one or more group IDs, privileges, etc.

By providing an authentication package SID 112 within operating system representation 110, subsequent security functions will be able to further differentiate between users/accounts. This benefit and others are described below, following an overview of an exemplary security arrangement comprising an object manager 114, a security mechanism 116 and an ACL 118.

When the user's process desires access to another object it specifies the type of access it desires (e.g., obtain read/write access to a file object) and at the kernel level provides it's a corresponding operating system representation 110 to an object manager 114. The object being sought has a kernel level security descriptor associated with it that includes ACL 118. Object manager 110 causes operating system representation 110 and ACL 118 to be provided to security mechanism 116.

Within ACL 118 there is at least one access control entry (ACE) 120 that defines certain access rights (allowed or denied actions) corresponding to that entry. For example, ACE 120 may include a type (deny or allow) indicator, flags, one or more SIDs and access rights in the form of a bitmask wherein each bit corresponds to a permission (e.g., one bit for read access, one for write and so on).

As such, security mechanism 116 is able to compare the SID(s) in operating system representation 110 along with the type of action or actions requested by the user's process against the ACE(s) 120 in ACL 118. If a match is found with an allowed user or group, and the type of access desired is allowable for the user or group, a handle to the desired object is returned to the user's process, otherwise access is denied.

With the addition of authentication package SID(s) 112, security mechanism 116 may also consider the authentication package or mechanism. Thus, for example, a user that was authenticated using NTLM may be denied access to the desired object based on a deny NTLM authentication ACE 120 in ACL 118, while a another user who was authenticated with Kerberos is allowed access to the desired object. Further granularity is provided by defining different SIDs 112 and ACEs 120 based on authentication package 104, sub-authentication package 108, key 106, or any combination thereof.

Figure 2:
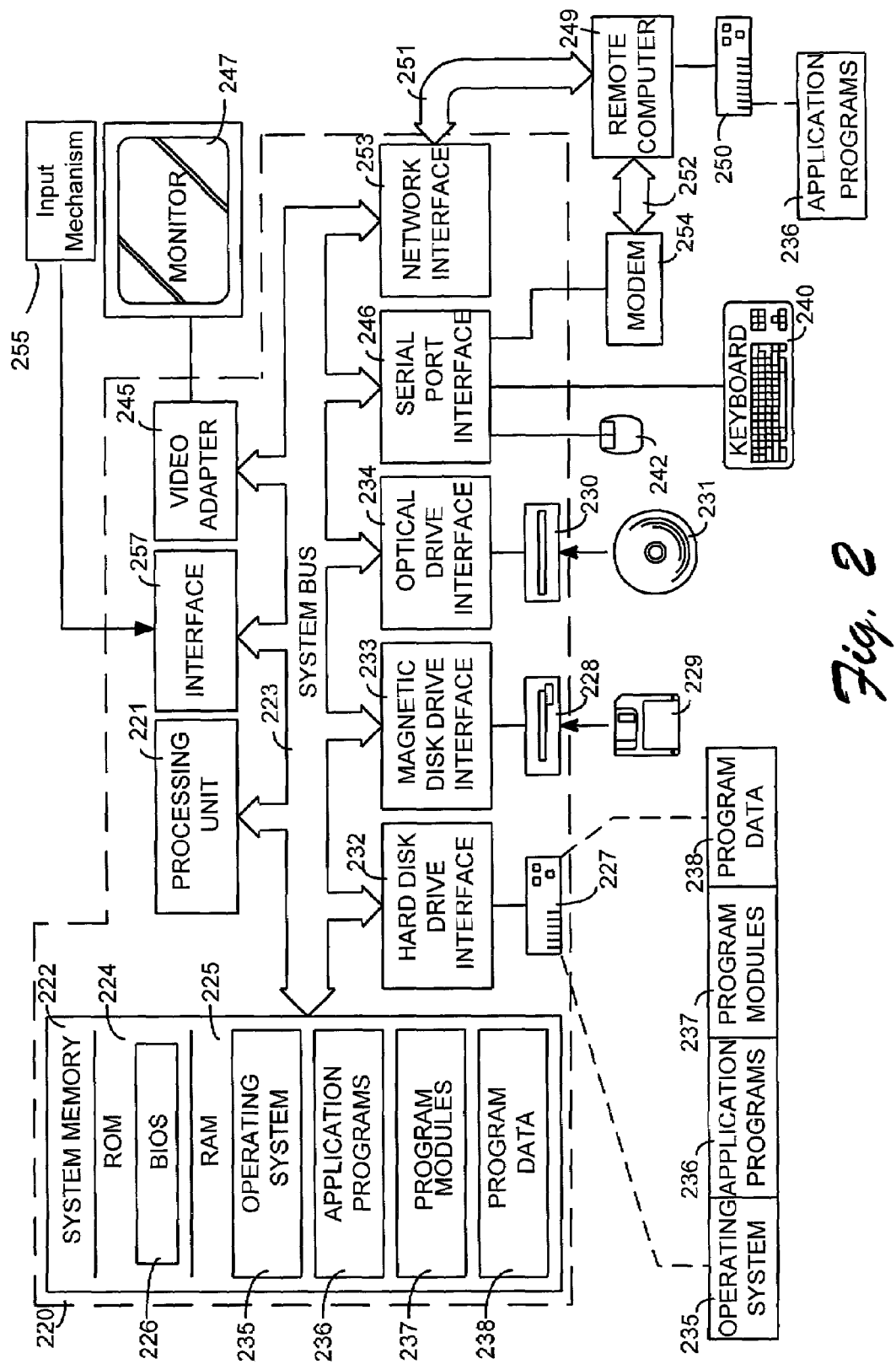
FIG. 2 is a block diagram illustrating an exemplary computing environment, suitable for use with the arrangement in FIG. 1.

Attention is now drawn to FIG. 2, which is a block diagram depicting an exemplary computing system 200 suitable with arrangement 100.

Computing system 200 is, in this example, in the form of a personal computer (PC), however, in other examples computing system may take the form of a dedicated server (s), a special-purpose device, an appliance, a handheld computing device, a mobile telephone device, a pager device, etc.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse). A camera/microphone 255 or other like media device capable of capturing or otherwise outputting real-time data 256 can also be included as an input device to computing system 200. The real-time data 256 can be input into computing system 200 via an appropriate interface 257. Interface 257 can be connected to the system bus 223, thereby allowing real-time data 256 to be stored in RAM 225, or one of the other data storage devices, or otherwise processed.

As shown, a monitor 247 or other type of display device is also connected to the system bus 223 via an interface, such as a video adapter 248. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method for use in a computer capable of supporting multiple authentication mechanisms, the method comprising:

generating at least one access token that identifies a user, and is associated with and identifies at least one authentication mechanism that has been used to authenticate the user, wherein generating the access token further includes identifying within the access token at least one characteristic associated with the authentication mechanism, wherein the at least one characteristic associated with the authentication mechanism includes a measure of strength of the authentication mechanism, wherein the measure of strength of the authentication mechanism depends on the length of key employed in an encryption process; and controlling the user's access to at least one resource based on the access token.

2. The method as recited in claim 1, wherein generating the access token further includes receiving inputs, providing the inputs to the authentication mechanism, and causing the authentication mechanism to generate at least one security identifier (SID) that identifies the authentication mechanism.

3. The method as recited in claim 1, wherein the measure of strength of the authentication mechanism identifies a length of an encryption key employed by the authentication mechanism.

4. The method as recited in claim 1, wherein controlling access to the resource based on the access token further includes comparing the access token to at least one access control list having at least one access control entry therein.

5. The method as recited in claim 4, wherein if the access control entry operatively specifies that the at least one authentication mechanism is permitted to access the resource, then access to the at least one resource is allowed to proceed.

6. The method as recited in claim 4, wherein if the access control entry operatively specifies that the at least one authentication mechanism is not permitted to access the resource, then access to the at least one resource is not allowed to proceed.

7. The method as recited in claim 4, wherein if the access control entry does not operatively specify that the at least one authentication mechanism is permitted to access the resource, then access to the at least one resource is not allowed to proceed.

8. A computer-readable medium for use in a device capable of supporting multiple authentication mechanisms, the computer-readable medium having computer-executable instructions for performing acts comprising:
producing at least one access token that identifies a user, and uniquely identifies at least one authentication mechanism supported by the device that has been used to authenticate the user, wherein producing the access token further includes identifying within the access token at least one characteristic of the authentication mechanism, wherein the at least one characteristic of the authentication mechanism includes a strength characteristic of the authentication mechanism, wherein the strength characteristic of the authentication mechanism depends on the length of key employed in an encryption process; and
causing the device to selectively control the user's access to at least one resource operatively coupled to the device based at least in part on the access token.

9. The computer-readable medium as recited in claim 8, wherein producing the access token further includes receiving inputs, providing the inputs to the authentication mechanism, and causing the authentication mechanism to generate at least one security identifier (SID) that identifies the authentication mechanism, in response thereto.

10. The computer-readable medium as recited in claim 9, wherein the strength characteristic identifies a length of an encryption key employed by the authentication mechanism.

11. The computer-readable medium as recited in claim 8, wherein causing the device to selectively control access to the at least one resource based on the access token further includes causing the device to compare the access token to control data.

12. The computer-readable medium as recited in claim 11, wherein if the control data specifies that the authentication mechanism is permitted to access the resource, to which subsequent access to the resource is allowed.

13. The computer-readable medium as recited in claim 11, wherein if the control data operatively specifies that the authentication mechanism is not permitted to access the resource, to which subsequent access to the resource is prohibited.

14. The computer-readable medium as recited in claim 11, wherein if the control data does not operatively specify that the authentication mechanism is permitted to access the resource, to which subsequent access to the resource is prohibited.

15. An apparatus comprising:
at least one authentication mechanism facilitating generation of at least one access token that identifies a user, and identifies the authentication mechanism that has been used to authenticate the user, wherein the access token further includes at least one identifying characteristic associated with the authentication mechanism, wherein the at least one identifying characteristic associated with the authentication mechanism indicates a measure of strength of the authentication mechanism, wherein the measure of strength of the authentication mechanism depends on the length of key employed in an encryption process;
an access control list;
at least one access controlled resource; and
logic operatively facilitating comparison of the access token with the access control list and selectively control the user's access to the resource based on the access token.

16. The apparatus as recited in claim 15, wherein the authentication mechanism is further configured to receive user inputs and generate at least one security identifier (SID) that identifies the authentication mechanism based on the user inputs.

17. The apparatus as recited in claim 15, wherein the measure of strength of the authentication mechanism identifies a length of an encryption key employed by the authentication mechanism.

* * * * *